United States Patent
Yukikata et al.

(10) Patent No.: US 11,806,817 B2
(45) Date of Patent: Nov. 7, 2023

(54) FLUX AND SOLDER PASTE

(71) Applicant: KOKI Company Limited, Tokyo (JP)

(72) Inventors: Kazuhiro Yukikata, Tokyo (JP); Takefumi Arai, Tokyo (JP); Yuri Misumi, Tokyo (JP)

(73) Assignee: KOKI Company Limited, Tokyo (JP)

( * ) Notice: Subject to any disclaimer, the term of this patent is extended or adjusted under 35 U.S.C. 154(b) by 0 days.

(21) Appl. No.: 17/794,283

(22) PCT Filed: Sep. 22, 2021

(86) PCT No.: PCT/JP2021/034878
§ 371 (c)(1),
(2) Date: Jul. 21, 2022

(87) PCT Pub. No.: WO2022/065389
PCT Pub. Date: Mar. 31, 2022

(65) Prior Publication Data
US 2023/0090002 A1    Mar. 23, 2023

(30) Foreign Application Priority Data
Sep. 23, 2020   (JP) .................................. 2020-158911

(51) Int. Cl.
| | | |
|---|---|---|
| *B23K 35/363* | (2006.01) | |
| *B23K 35/36* | (2006.01) | |
| *B23K 35/02* | (2006.01) | |
| *B23K 35/26* | (2006.01) | |
| *B23K 35/362* | (2006.01) | |
| *C22C 13/00* | (2006.01) | |

(52) U.S. Cl.
CPC ........ *B23K 35/3613* (2013.01); *B23K 35/025* (2013.01); *B23K 35/262* (2013.01); *B23K 35/362* (2013.01); *C22C 13/00* (2013.01)

(58) Field of Classification Search
CPC .................................................. B23K 35/3613
See application file for complete search history.

(56) References Cited

U.S. PATENT DOCUMENTS

| | | |
|---|---|---|
| 2019/0084097 A1 | 3/2019 | Shibasaki et al. |
| 2019/0182966 A1 | 6/2019 | Yamamoto et al. |
| 2021/0387292 A1 | 12/2021 | Shirakawa et al. |

FOREIGN PATENT DOCUMENTS

| | | | |
|---|---|---|---|
| CN | 107695565 | 2/2018 | |
| CN | 109530977 | 3/2019 | |
| JP | 59-229296 | 12/1984 | |
| JP | 60-33895 | 2/1985 | |
| JP | 60-133998 | 7/1985 | |
| JP | 63-281794 | 11/1988 | |
| JP | 05-114772 | 5/1993 | |
| JP | 06-071481 | 3/1994 | |
| JP | 07-236991 | 9/1995 | |
| JP | 2019-055428 | 4/2019 | |
| JP | 2019055428 A | * 4/2019 | ........... B23K 35/025 |
| JP | 2020-040095 | 3/2020 | |
| KR | 2019-0033449 | 3/2019 | |
| TW | 202019602 | 6/2020 | |
| WO | 2014/021204 | 2/2014 | |
| WO | 2015/162881 | 10/2015 | |
| WO | 2018/025903 | 2/2018 | |

OTHER PUBLICATIONS

English translation of CN 107695565 (originally published Feb. 16, 2018), obtained from PE2E search.*

* cited by examiner

*Primary Examiner* — George Wyszomierski
(74) *Attorney, Agent, or Firm* — Clark & Brody LP

(57) ABSTRACT

A flux according to the present invention is a flux for soldering, the flux including: an unsaturated aliphatic alcohol having one unsaturated bond, a thixotropic agent, and a solvent, in which the unsaturated aliphatic alcohol includes oleyl alcohol, and a content of the oleyl alcohol is 2.0 mass % or more and 12.0 mass % or less based on the entire flux.

16 Claims, No Drawings

FLUX AND SOLDER PASTE

CROSS-REFERENCE TO RELATED APPLICATION

This application claims priority to Japanese Patent Application No. 2020-158911, the disclosure of which is incorporated herein by reference in its entirety.

FIELD

The present invention relates to a flux used for soldering, and a solder paste including the flux.

BACKGROUND

A solder paste in which a solder alloy and a flux are mixed together is used in a mounting technology for mounting an electronic component such as a chip part or a package substrate on an electronic circuit board such as a printed wiring board. Specifically, a solder paste is screen-printed using a metal stencil on a pad of the electronic circuit board surface, and thereafter the electronic component is mounted thereon and heated (reflowed) to thereby join the electronic component onto the electronic circuit board.

In recent years, miniaturization of electronic components has been advanced in association with the miniaturization of electronic devices and improvement in functions of electronic devices. For such small components, a metal stencil having minute openings is used. However, there are some cases where components in a wide range of size from the small components to the conventional large components are mounted in combination on the electronic circuit board when mounted on, for example, a board for vehicle. When a metal stencil having minute openings is used in such a case, the amount of solder to be supplied to the large components may lack and thereby cause the reduction in bonding strength. On the other hand, when the thickness of the metal stencil is increased in order to secure the amount of solder to be supplied to the large components, the aspect ratio (that is, the ratio of the area of the openings to the area of the side surface of the openings) is decreased, which makes it easy to adhere the solder paste to the side surface of the openings of the metal stencil, and may cause shortage of the amount of solder to be supplied to the small components as a result.

For example, Patent Literature 1 discloses a solder paste using a flux including a certain amount of an alkylene-(meth) acrylic acid copolymer resin as a base resin in order to secure an excellent printability even in using a metal stencil having a low aspect ratio.

CITATION LIST

Patent Literature

Patent Literature 1: JP 2020-40095 A

Meanwhile, there is a tendency in recent years that an opening of a metal stencil is further miniaturized in association with further miniaturization of electronic components, and there is a demand for a solder paste having an excellent printability to a metal stencil having a lower aspect ratio.

SUMMARY

Technical Problem

The present invention has been conceived in view of the above circumstances, and it is an object of the present invention to provide a flux that enables an improved printability at the time of using a metal stencil having minute openings and a low aspect ratio, and a solder paste including the flux.

Solution to Problem

The flux according to the present invention is a flux according to the present invention is a flux for soldering, the flux including an unsaturated aliphatic alcohol having one unsaturated bond, a thixotropic agent, and a solvent, in which the unsaturated aliphatic alcohol includes oleyl alcohol, and a content of the oleyl alcohol is 2.0 mass % or more and 12.0 mass % or less based on the entire flux.

In the flux according to the present invention, a content of the oleyl alcohol can be 4.0 mass % or more and 8.0 mass % or less based on the entire flux.

In the flux according to the present invention, the unsaturated aliphatic alcohol can be composed of oleyl alcohol only.

The solder paste according to the present invention includes the aforementioned flux and solder alloy powder.

In the solder paste according to the present invention, an alloy of the solder alloy powder can be an alloy of Sn/Ag/Cu.

In the solder paste according to the present invention, the alloy of Sn/Ag/Cu can further include at least one selected from the group consisting of In, Bi, Sb, and Ni.

DESCRIPTION OF EMBODIMENTS

Hereinafter, a flux and a solder paste according to an embodiment of the present invention will be described.
<Flux>

The flux according to this embodiment includes an unsaturated aliphatic alcohol having an unsaturated bond, a thixotropic agent, and a solvent.
(Unsaturated Aliphatic Alcohol)

The flux according to this embodiment includes an unsaturated aliphatic alcohol having one unsaturated bond. The unsaturated aliphatic alcohol includes oleyl alcohol. The unsaturated aliphatic alcohol is preferably composed of oleyl alcohol. Note that oleyl alcohol herein means a 18 C cis-form linear aliphatic alcohol having a double bond at 9 position.

The content of oleyl alcohol is preferably 2.0 mass % or more, also preferably 4.0 mass % or more based on the entire flux in terms of improving slipperiness of the solder paste. The content of oleyl alcohol is preferably 12.0 mass % or less, also preferably 8.0 mass % or less based on the entire flux.

The unsaturated aliphatic alcohol can include another unsaturated aliphatic alcohol different from oleyl alcohol. Examples of the other unsaturated aliphatic alcohol include trans-2-tridecen-1-ol, palmitoleyl alcohol, and elaidyl alcohol. In terms of improving the slipperiness of the solder paste on the opening side surface of the metal stencil, the content of the other unsaturated aliphatic alcohol is preferably 12.0 mass % or less, more preferably 8.0 mass % or less based on the entire flux, and it is still more preferable that the other unsaturated aliphatic alcohol be not included. The other unsaturated aliphatic alcohols can be individually used, or two or more of them can be used in combination.
(Thixotropic Agent)

The flux according to this embodiment includes a thixotropic agent. Examples of the thixotropic agent include a hydrogenated castor oil, an aliphatic amide, an aliphatic bisamide, a polyamide compound, a kaolin, a colloidal silica, an organic bentonite, and a glass frit. Among them, the thixotropic agent is preferably the aliphatic bisamide or the polyamide compound in terms of heat resistance. Examples of the aliphatic bisamide include methylenebis stearic acid amide, ethylenebis capric acid amide, ethylenebis lauric acid amide, ethylenebis stearic acid amide, ethylenebis hydroxystearic acid amide, ethylenebis behenic acid amide, hexamethylenebis stearic acid amide, hexamethylenebis behenic acid amide, hexamethylenebis hydroxystearic acid amide, N,N'-distearyl adipic acid amide, and N,N'-xylylenebis-12-hydroxystearyl amide. Examples of the polyamide compound include: an aliphatic polyamide compound such as TALEN VA-79, AMX-6096A, WH-215, WH-255 (each manufactured by KYOEISHA CHEMICAL Co., LTD.), SP-10, SP-500 (each manufactured by Toray Industries, Inc.), Grilamid L20G, Grilamid TR55 (each manufactured by EMS-CHEMIE (Japan) Ltd.); and an aromatic polyamide compound (a semi-aromatic polyamide compound or a wholly aromatic polyamide compound) including a cyclic compound such as a benzene ring or a naphthalene ring in a main chain such as JH-180 (manufactured by Itoh Oil Chemicals Co., Ltd.). The thixotropic agents can be individually used, or two or more of them can be used in combination.

The content of the thixotropic agent is preferably 1.0 mass % or more, more preferably 3.0 mass % or more based on the entire flux. The content of the thixotropic agent is preferably 7.0 mass % or less, more preferably 5.0 mass % or less based on the entire flux. When two or more thixotropic agents are included, the aforementioned content means the total content of the thixotropic agents.

(Solvent)

The flux according to this embodiment includes a solvent. As the solvent, a known solvent can be used and examples thereof include: glycol ethers such as diethylene glycol monohexyl ether (hexyl diglycol), diethylene glycol dibutyl ether (dibutyl diglycol), diethylene glycol mono 2-ethylhexyl ether (2 ethylhexyl diglycol), diethylene glycol monobutyl ether (butyl diglycol), triethylene glycol monobutyl ether (butyl triglycol), polyethylene glycol dimethyl ether, and tripropylene glycol n-butyl ether; aliphatic compounds such as n-hexane, isohexane, and n-heptane; esters such as isopropyl acetate, methyl propionate, and ethyl propionate; ketones such as methyl ethyl ketone, methyl-n-propyl ketone, and diethyl ketone; and alcohols such as ethanol, n-propanol, isopropanol, and isobutanol. The solvents can be individually used, or two or more of them can be used in combination.

The content of the solvent is preferably 30.0 mass % or more, more preferably 40.0 mass % or more based on the entire flux. The content of the solvent is preferably 55.0 mass % or less, more preferably 47.0 mass % or less based on the entire flux. When two or more different solvents are included, the aforementioned content means the total content of the solvents.

(Resin)

The flux according to this embodiment can include a resin. Examples of the resin include a rosin-based resin and a synthetic resin. The rosin-based resin is not particularly limited, and, for example, at least one or more rosin-based resins selected from the group consisting of a rosin and a rosin derivative (for example, a hydrogenated rosin, a polymerized rosin, a disproportionated rosin, and an acrylic acid modified rosin) can be used. As the synthetic resin, a known synthetic resin such as a terpene phenol resin can be used. These resins can be individually used, or two or more of them can be used in combination.

The content of the resin is preferably 30.0 mass % or more, more preferably 40.0 mass % or more based on the entire flux. The content of the resin is preferably 70.0 mass % or less, more preferably 50.0 mass % or less based on the entire flux. When two or more resins are included, the aforementioned content means the total content of the resins.

(Saturated Aliphatic Alcohol)

The flux according to this embodiment can include a saturated aliphatic alcohol. The saturated aliphatic alcohol is not particularly limited, and examples thereof include 1-tridecanol, cetanol, 1-heptadecanol, stearyl alcohol, and isostearyl alcohol. In terms of improving the slipperiness of the solder paste on the opening side surface of the metal stencil, the content of the saturated aliphatic alcohol is preferably 8.0 mass % or less, more preferably 5.0 mass % or less based on the entire flux, and it is still more preferable that the saturated aliphatic alcohol be not included. The saturated aliphatic alcohols can be individually used, or two or more of them can be used in combination.

(Activator)

The flux according to this embodiment can include an activator. The activator is not particularly limited, and examples thereof include an organic acid-based activator, an amine compound, an amino acid compound, and a halogen-based activator such as an amine halogen salt or a halogen compound. The activators can be individually used, or two or more of them can be used in combination.

The organic acid-based activator is not particularly limited, and examples thereof include: a monocarboxylic acid such as formic acid, acetic acid, propionic acid, butyric acid, valeric acid, caproic acid, enanthic acid, capric acid, lauric acid, myristic acid, pentadecyl acid, palmitic acid, margaric acid, stearic acid, tuberculostearic acid, arachidic acid, behenic acid, lignoceric acid, and glycolic acid; a dicarboxylic acid such as oxalic acid, malonic acid, succinic acid, methylsuccinic acid, glutaric acid, adipic acid, pimeric acid, suberic acid, azelaic acid, sebacic acid, fumaric acid, maleic acid, tartaric acid, and diglycolic acid; and other organic acids such as dimer acid, levulinic acid, lactic acid, acrylic acid, benzoic acid, salicylic acid, anisic acid, citric acid, picolinic acid, tris(2-carboxyethyl)isocyanuric acid, and tris(2-carboxypropyl)isocyanuric acid.

Examples of the halogen compound include tris(2,3-dibromopropyl)isocyanuric acid, 2,3-dibromo-2-butene-1,4-diol, 2-bromo-3-iodine-2-butene-1,4-diol, and TBA-bis(2,3-dibromopropyl ether).

The content of the activator is preferably 0.5 mass % or more, more preferably 3.0 mass % or more based on the entire flux. The content of the activator is preferably 20.0 mass % or less, more preferably 10.0 mass % or less based on the entire flux. When two or more activators are included, the aforementioned content means the total content of the activators.

The flux according to this embodiment can include, for example, at least one selected from the group consisting of a stabilizer, a surfactant, a defoamer, and a corrosion inhibitor, as other additives. The content of the other additives is not particularly limited, and can be, for example, 5.0 mass % or less based on the entire flux.

The flux according to this embodiment includes an unsaturated aliphatic alcohol having one unsaturated bond, a thixotropic agent, and a solvent, in which the unsaturated aliphatic alcohol includes oleyl alcohol, and a content of the oleyl alcohol is 2.0 mass % or more and 12.0 mass % or less based on the entire flux, to thereby improve the slipperiness of the solder paste on the opening side surface of the metal stencil and make it hard for the solder paste to adhere to the opening side surface of the metal stencil. As a result, the flux can improve the printability of the solder paste at the time of using a metal stencil having minute openings and a low aspect ratio.

In the flux according to this embodiment, the content of oleyl alcohol is 4.0 mass % or more and 8.0 mass % or less based on the entire flux, to thereby further improve the slipperiness of the solder paste on the opening side surface of the metal stencil and make it harder for the solder paste to adhere to the opening side surface of the metal stencil. As a result, the flux can further improve the printability of the solder paste at the time of using a metal stencil having minute openings and a low aspect ratio.

In the flux according to this embodiment, the unsaturated aliphatic alcohol is composed of oleyl alcohol, to thereby further improve the slipperiness of the solder paste on the opening side surface of the metal stencil and make it harder for the solder paste to adhere to the opening side surface of the metal stencil. As a result, the flux can further improve the printability of the solder paste at the time of using a metal stencil having minute openings and a low aspect ratio.

<Solder Paste>

The solder paste according to this embodiment includes the aforementioned flux and a solder alloy powder. The solder paste is obtained by mixing the flux with the solder alloy powder. The content of the flux is preferably 5.0 mass % or more and 20 mass % or less based on the entire solder paste. The content of the solder alloy powder is preferably 80 mass % or more and 95 mass % or less based on the entire solder paste.

Examples of the solder alloy powder include a lead-free solder alloy and a eutectic solder alloy including lead. In terms of reducing the environmental load, a lead-free solder alloy is preferable. Examples of the lead-free solder alloy include an alloy including tin, silver, copper, indium, zinc, bismuth, antimony, and the like. More specifically, examples of such an alloy include an alloy of Sn/Ag, Sn/Ag/Cu, Sn/Cu, Sn/Ag/Bi, Sn/Bi, Sn/Ag/Cu/Bi, Sn/Sb, Sn/Zn/Bi, Sn/Zn, Sn/Zn/Al, Sn/Ag/Bi/In, Sn/Ag/Cu/Bi/In/Sb, or In/Ag. Among them, the alloy of the solder alloy powder is preferably an alloy of Sn/Ag/Cu. The alloy of Sn/Ag/Cu preferably further includes at least one selected from the group consisting of In, Bi, Sb, and Ni. The alloy contains unavoidable impurities. The unavoidable impurities herein mean components which are unavoidably mixed during the production process and acceptable within such a range as not to influence on the effect of the present invention.

The particle size of the solder alloy powder is preferably 5 μm or more and 45 μm or less, more preferably 15 μm or more and 39 μm or less.

The solder paste according to this embodiment includes the flux and the solder alloy powder as aforementioned. The flux improves the slipperiness of the solder paste on the opening side surface of the metal stencil and make it hard for the solder paste to adhere to the side surface of the openings in the metal stencil. As a result, the solder paste can improve the printability of the solder paste at the time of using a metal stencil having minute openings and a low aspect ratio.

The alloy of the solder alloy powder in the solder paste according to this embodiment can be an alloy of Sn/Ag/Cu. Even if the solder paste includes the alloy of Sn/Ag/Cu which is used widely and commonly, it can also improve the printability of the solder paste at the time of using a metal stencil having minute openings and a low aspect ratio.

The alloy of Sn/Ag/Cu in the solder paste according to this embodiment can further include at least one selected from the group consisting of In, Bi, Sb, and Ni. Even in the case where these metal elements are added for the purpose of improving the thermal durability of the solder alloy, the solder paste can improve the printability of the solder paste at the time of using a metal stencil having minute openings and a low aspect ratio.

The flux and the solder paste according to the present invention are not limited to the configuration of the aforementioned embodiment and various modifications can be made without departing from the gist of the present invention. Further, the flux and the solder paste according to the present invention are not limited to those having the aforementioned operational effects. That is, the embodiments disclosed herein should be assumed as not limitations but exemplifications in all aspects. The scope of the present invention is described not by the above description but by the claims. Further, the scope of the present invention is intended to include the scope equivalent to the claims and all the changes in the claims.

EXAMPLES

Hereinafter, the present invention will be described in more detail with reference to test examples, but not limited thereto.

<Preparation of Solder Paste>

A resin, a solvent, an unsaturated aliphatic alcohol, a saturated aliphatic alcohol, a thixotropic agent, an activator, and an antioxidant in the mixing amounts shown in Table 1, Table 2, and Table 3 were put into a heating container and heated to 180° C. to obtain a varnish component. Then, the varnish component and the other components were mixed at room temperature to obtain uniformly dispersed fluxes. The mixing amounts shown in Table 1, Table 2, and Table 3 are respectively equal to the contents of the corresponding components included in each flux. Next, mixing was made to have 11.8 mass % of each flux and 88.2 mass % of solder alloy powder shown in Table 1, Table 2, and Table 3 to obtain a solder paste of each of Examples and each of Comparative Examples.

TABLE 1

| | | | Ex. 1 | Ex. 2 | Ex. 3 | Ex. 4 | Ex. 5 | Ex. 6 |
|---|---|---|---|---|---|---|---|---|
| Mixing amounts (mass %) | Resin | KE-604 | 44.9 | 4.42 | 43.1 | 42.5 | 41.8 | 40.8 |
| | Solvent | BTG | 44.9 | 4.42 | 43.1 | 42.5 | 41.8 | 40.8 |
| | Unsaturated aliphatic alcohol | Oleyl alcohol VP | 2.5 | 4.1 | 6.4 | 7.9 | 9.3 | 11.4 |
| | Thixotropic agent | AMX-6096A | 3.15 | 3.09 | 3.02 | 2.97 | 2.93 | 2.86 |

TABLE 1-continued

|  |  |  |  |  |  |  |  |  |
|---|---|---|---|---|---|---|---|---|
| Activator |  | Adipic acid | 1.35 | 1.33 | 1.29 | 1.27 | 1.25 | 1.23 |
|  |  | Sebacic acid | 1.35 | 1.33 | 1.29 | 1.27 | 1.25 | 1.23 |
|  |  | Tris(2-carboxypropyl)isocyanuric acid | 0.67 | 0.66 | 0.65 | 0.64 | 0.63 | 0.61 |
| Antioxidant |  | 2,2'-Methylenebis(6-tert-4-methylphenol) | 1.12 | 1.10 | 1.08 | 1.06 | 1.04 | 1.02 |
|  |  | Solder alloy | S3X5B | S3X58 | S3X58 | S3X58 | S3X58 | S3X58 |
|  |  | Effective ratio of oleyl alcohol | 2.5% | 4.1% | 6.4% | 7.9% | 9.3% | 11.4% |
| Evaluation result | Mask thickness: t = 0.15 mm Shape and size of pad: □, 0.25 mm × 0.25 mm | Packing ratio 100% or more | 0% | 0% | 1% | 0% | 0% | 0% |
|  |  | Packing ratio 70% or more and less than 100% | 94% | 92% | 95% | 98% | 96% | 97% |
|  |  | Packing ratio less than 70% | 6% | 8% | 4% | 2% | 4% | 3% |
|  |  | Determination | Pass | Pass | Pass | Pass | Pass | Pass |

|  |  |  | Ex. 7 | Ex. 8 | Ex. 9 | Ex. 10 |
|---|---|---|---|---|---|---|
| Mixing amounts (mass %) | Resin | KE-604 | 42.5 | 42.5 | 42.5 | 42.5 |
|  | Solvent | BTG | 42.5 | 42.5 | 42.5 | 42.5 |
|  | Unsaturated aliphatic alcohol | Oleyl alcohol VP | 7.9 | 7.9 | 7.9 | 7.9 |
|  | Thixotropic agent | AMX-6096A | 2.97 | 2.97 | 2.97 | 2.97 |
|  | Activator | Adipic acid | 1.27 | 1.27 | 1.27 | 1.27 |
|  |  | Sebacic acid | 1.27 | 1.27 | 1.27 | 1.27 |
|  |  | Tris(2-carboxypropyl)isocyanuric acid | 0.64 | 0.64 | 0.64 | 0.64 |
|  | Antioxidant | 2,2'-Methylenebis(6-tert-4-methylphenol) | 1.06 | 1.06 | 1.06 | 1.06 |
|  |  | Solder alloy | S01XBIG58 | SB6N58 | S5A58 | S3X70 |
|  |  | Effective ratio of oleyl alcohol | 7.9% | 7.9% | 7.9% | 7.9% |
| Evaluation result | Mask thickness: t = 0.15 mm Shape and size of pad: □, 0.25 mm × 0.25 mm | Packing ratio 100% or more | 0% | 0% | 0% | 0% |
|  |  | Packing ratio 70% or more and less than 100% | 91% | 99% | 90% | 100% |
|  |  | Packing ratio less than 70% | 9% | 1% | 10% | 0% |
|  |  | Determination | Pass | Pass | Pass | Pass |

TABLE 2

|  |  |  | Ex. 11 | Ex. 12 | Ex. 13 | Ex. 14 | Ex. 15 |
|---|---|---|---|---|---|---|---|
| Mixing amounts (mass %) | Resin | KE-604 | 42.5 | 42.5 | 34.0 | 42.4 | 42.5 |
|  |  | S-145 | — | — | 8.5 | — | — |
|  | Solvent | BTG | 42.5 | 42.5 | 42.5 | 42.5 | — |
|  |  | TPnB | — | — | — | — | 42.5 |
|  |  | MPM | — | — | — | — | — |
|  | Unsaturated aliphatic alcohol | Oleyl alcohol VP | 7.9 | 7.9 | 7.9 | 7.9 | 7.9 |
|  |  | Novol | — | — | — | — | — |
|  |  | RIKACOL 60B | — | — | — | — | — |
|  |  | RIKACOL 75BJ | — | — | — | — | — |
|  |  | RIKACOL 110BJ | — | — | — | — | — |
|  | Thixotropic agent | SLIPAX ZHH | 2.97 | — | — | — | — |
|  |  | AMX-6096A | — | — | 2.97 | 2.97 | 2.97 |
|  |  | TALEN VA-79 | — | 2.97 | — | — | — |
|  | Activator | Adipic acid | 1.27 | 1.27 | 1.27 | 1.27 | 1.27 |
|  |  | Sebacic acid | 1.27 | 1.27 | 1.27 | 1.27 | 1.27 |
|  |  | Tris(2-carboxypropyl)isocyanuric acid | 0.64 | 0.64 | 0.64 | 0.64 | 0.64 |
|  |  | 2,3-Dibromo-2-butene-1,4-diol | — | — | — | 0.40 | — |
|  | Antioxidant | 2,2'-Methylenebis(6-tert-4-methylphenol) | 1.06 | 1.06 | 1.06 | 1.06 | 1.06 |
|  |  | Solder alloy | S3X58 | S3X58 | S3X58 | S3X58 | S3X58 |
|  |  | Effective ratio of oleyl alcohol | 7.9% | 7.9% | 7.9% | 7.9% | 7.9% |
| Evaluation result | Mask thickness: t = 0.15 mm Shape and size of pad: □, 0.25 mm × 0.25 mm | Packing ratio 100% or more | 0% | 0% | 0% | 0% | 0% |
|  |  | Packing ratio 70% or more and less than 100% | 93% | 95% | 97% | 97% | 96% |
|  |  | Packing ratio less than 70% | 7% | 5% | 3% | 3% | 4% |
|  |  | Determination | Pass | Pass | Pass | Pass | Pass |

|  |  |  | Ex. 16 | Ex. 17 | Ex. 18 | Ex. 19 | Ex. 20 |
|---|---|---|---|---|---|---|---|
| Mixing amounts (mass %) | Resin | KE-604 | 42.5 | 42.5 | 42.5 | 42.5 | 42.5 |
|  |  | S-145 | — | — | — | — | — |
|  | Solvent | BTG | — | 42.5 | 42.5 | 42.5 | 42.5 |
|  |  | TPnB | — | — | — | — | — |
|  |  | MPM | 42.5 | — | — | — | — |
|  | Unsaturated aliphatic alcohol | Oleyl alcohol VP | 7.9 | — | — | — | — |
|  |  | Novol | — | 7.9 | — | — | — |
|  |  | RIKACOL 60B | — | — | 7.9 | — | — |
|  |  | RIKACOL 75BJ | — | — | — | 7.9 | — |
|  |  | RIKACOL 110BJ | — | — | — | — | 7.9 |

TABLE 2-continued

| | | | | | | |
|---|---|---|---|---|---|---|
| Thixotropic agent | SLIPAX ZHH | — | — | — | — | — |
| | AMX-6096A | 2.97 | 2.97 | 2.97 | 2.97 | 2.97 |
| | TALEN VA-79 | — | — | — | — | — |
| Activator | Adipic acid | 1.27 | 1.27 | 1.27 | 1.27 | 1.27 |
| | Sebacic acid | 1.27 | 1.27 | 1.27 | 1.27 | 1.27 |
| | Tris(2-carboxypropyl)isocyanuric acid | 0.64 | 0.64 | 0.64 | 0.64 | 0.64 |
| | 2,3-Dibromo-2-butene-1,4-diol | — | — | — | — | — |
| Antioxidant | 2,2'-Methylenebis(6-tert-4-methylphenol) | 1.06 | 1.06 | 1.06 | 1.06 | 1.06 |
| | Solder alloy | S3X58 | S3X58 | S3X58 | S3X58 | S3X58 |
| | Effective ratio of oleyl alcohol | 7.9% | 7.9% | 4.4% | 5.2% | 4.5% |
| Evaluation result | Mask thickness: t = 0.15 mm Shape and size of pad: □, 0.25 mm × 0.25 mm | Packing ratio 100% or more | 0% | 0% | 0% | 0% | 0% |
| | | Packing ratio 70% or more and less than 100% | 99% | 90% | 96% | 92% | 90% |
| | | Packing ratio less than 70% | 1% | 10% | 4% | 8% | 10% |
| | Determination | Pass | Pass | Pass | Pass | Pass |

TABLE 3

| | | | C. Ex. 1 | C. Ex. 2 | C. Ex. 3 | C. Ex. 4 |
|---|---|---|---|---|---|---|
| Mixing amounts (mass %) | Resin | KE-604 | 45.1 | 46.1 | 46.1 | 39.4 |
| | Solvent | BTG | 46.1 | — | — | 39.4 |
| | | TPnB | — | 46.1 | — | — |
| | | MPM | — | — | 46.1 | — |
| | Unsaturated aliphatic alcohol | Oleyl alcohol VP | — | — | — | 14.6 |
| | | Trans-2-tridecen-1-ol | — | — | — | — |
| | Saturated aliphatic alcohol | 1-Tridecanol | — | — | — | — |
| | | 1-Hexadecanol | — | — | — | — |
| | | 1-Octadecanol | — | — | — | — |
| | Thixotropic agent | AMX-6096A | 3.23 | 3.23 | 3.23 | 2.75 |
| | Activator | Adipic acid | 1.38 | 1.38 | 1.38 | 1.18 |
| | | Sebacic acid | 1.38 | 1.38 | 1.38 | 1.18 |
| | | Tris(2-carboxypropyl)isocyanuric acid | 0.69 | 0.69 | 0.69 | 0.59 |
| | Antioxidant | 2,2'-Methylenebis(6-tert-4-methylphenol) | 1.15 | 1.15 | 1.15 | 0.98 |
| | | Solder alloy | S3X58 | S3X58 | S3X58 | S3X58 |
| | | Effective ratio of oleyl alcohol | 0% | 0% | 0% | 14.6% |
| Evaluation result | Mask thickness: t = 0.15 mm Shape and size of pad: □, 0.25 mm × 0.25 mm | Packing ratio 100% or more | 0% | 2% | 0% | — |
| | | Packing ratio 70% or more and less than 100% | 89% | 77% | 66% | — |
| | | Packing ratio less than 70% | 11% | 21% | 34% | — |
| | Determination | Fail | Fail | Fail | Fail |

| | | | C. Ex. 5 | C. Ex. 6 | C. Ex. 7 | C. Ex. 8 |
|---|---|---|---|---|---|---|
| Mixing amounts (mass %) | Resin | KE-604 | 42.5 | 42.5 | 42.5 | 42.5 |
| | Solvent | BTG | 42.5 | 42.5 | 42.5 | 42.5 |
| | | TPnB | — | — | — | — |
| | | MPM | — | — | — | — |
| | Unsaturated aliphatic alcohol | Oleyl alcohol VP | — | — | — | — |
| | | Trans-2-tridecen-1-ol | 7.9 | — | — | — |
| | Saturated aliphatic alcohol | 1-Tridecanol | — | 7.9 | — | — |
| | | 1-Hexadecanol | — | — | 7.9 | — |
| | | 1-Octadecanol | — | — | — | 7.9 |
| | Thixotropic agent | AMX-6096A | 2.97 | 2.97 | 2.97 | 2.97 |
| | Activator | Adipic acid | 1.27 | 1.27 | 1.27 | 1.27 |
| | | Sebacic acid | 1.27 | 1.27 | 1.27 | 1.27 |
| | | Tris(2-carboxypropyl)isocyanuric acid | 0.64 | 0.64 | 0.64 | 0.64 |
| | Antioxidant | 2,2'-Methylenebis(6-tert-4-methylphenol) | 1.06 | 1.06 | 1.06 | 1.06 |
| | | Solder alloy | S3X58 | S3X58 | S3X58 | S3X58 |
| | | Effective ratio of oleyl alcohol | 0% | 0% | 0% | 0% |
| Evaluation result | Mask thickness: t = 0.15 mm Shape and size of pad: □, 0.25 mm × 0.25 mm | Packing ratio 100% or more | 0% | 0% | 0% | 0% |
| | | Packing ratio 70% or more and less than 100% | 55% | 65% | 75% | 86% |
| | | Packing ratio less than 70% | 45% | 35% | 25% | 14% |
| | Determination | Fail | Fail | Fail | Fail |

Details of each of the raw materials shown in Table 1, Table 2, and Table 3 are described in Table 4 below. Details of the solder alloy shown in Table 1, Table 2, and Table 3 are described in Table 5 below. Details of the unsaturated aliphatic alcohol shown in Table 1, Table 2, and Table 3 are described in Table 6 below. Each of the effective ratios of oleyl alcohol in Table 1, Table 2, and Table 3 was calculated from the content of oleyl alcohol included in each of the unsaturated aliphatic alcohols shown in Table 6. The effective ratios of oleyl alcohol in Table 1, Table 2, and Table 3 correspond to the contents of oleyl alcohol in the description herein.

and subjected to rolling 4 times in order to be well entwined with the metal stencil. Then, the backside of the metal stencil was subjected to dry cleaning, followed by printing 2 times in the following print conditions.

TABLE 4

|   | Product name | Compound name | Manufacturer |
|---|---|---|---|
| Resin | KE-604 | Acid-modified ultra pale rosin (acid value: 230-245 KOH mg/mg) | Arakawa Chemical Industries, Ltd. |
|  | S-145 | Terpene phenol resin | YASUHARA CHEMICAL CO., LTD. |
| Thixotropic agent | SLIPAX ZHH | Aliphatic bisamide | Nihon Kasei Co., Ltd. |
|  | AMX-6096A | Aliphatic polyamide compound | Kyoeisha Chemical Co., Ltd. |
|  | TALEN VA79 | Aliphatic polyamide compound | Kyoeisha Chemical Co., Ltd. |
| Solvent | BTG | Butyl triglycol | NIPPON NYUKAZAL CO., LTD. |
|  | TPnB | Tripropyene glycol n-butyl ether | Dow Chemical Japan Limited |
|  | MPM | Polyethylene glycol dimethyl ether | TOHO Chemical Industry Co.,Ltd. |
| Unsaturated aliphatic alcohol | Oleyl alcohol VP | Oleyl alcohol | KOKYU ALCOHOL KOGYO CO.. LTD |
|  | Novol | Oleyl alcohol | Croda Japan K.K. |
|  | RIKACOL 60B | Oleyl alcohol (Mixture) | New Japan Chemical Co., Ltd. |
|  | RIKACOL 75BJ | Oleyl alcohol (Mixture) | New Japan Chemical Co., Ltd. |
|  | RIKACOL 110BJ | Oleyl alcohol (Mixture) | New Japan Chemical Co., Ltd. |
|  | Trans-2-bidecen-1-ol | Trans-2-tridecen-1-ol | Tokyo Chemical Industry Co., Ltd. |
| Saturated aliphatic alcohol | 1-Tridecanol | 1-Tridecanol | Tokyo Chemical Industry Co., Ltd. |
|  | Cetanol | 1-Hexadecanol | Tokyo Chemical Industry Co., Ltd. |
|  | Stearyl alcohol | 1-Octadecanol | Tokyo Chemical Industry Co., Ltd. |
| Activator | Adipic acid | Adipic acid | Tokyo Chemical Industry Co., LTD |
|  | Sebacic acid | Sebacic acid | Tokyo Chemical Industry Co., Ltd. |
|  | Tris(2-carboxypropyl)isocyanuric acid | Tris(2-carboxypropyl)isocyanuric acid | Tokyo Chemical Industry Co., Ltd. |
|  | 2,3-Dibromo-2-butene-1,4-diol | 2,3-Dibromo-2-butene-1,4-diol | Tokyo Chemical Industry Co., Ltd. |
| Antioxidant | 2,2'-Methylenebis(6-tert-4-methyphenol) | 2,2'-Methyenebis(6-tert-4-methylphenol) | Tokyo Chemical Industry Co., Ltd. |

TABLE 5

| Name | Composition | Manufacturer | Particle size | IPC J-STD-005B |
|---|---|---|---|---|
| S3X58 | Sn 96.5% Ag 3.0% Cu 0.5% | KOKI Co, Ltd. | 20-39 μm | Type4 |
| S3X70 | Sn 96.5% Ag 3.0% Cu 0.5% |  | 15-28 μm | Type5 |
| S01XBIG58 | Sn 97.6% Ag 0.1% Cu 0.7% Bi 1.6% Ni 0.1% or less |  | 20-39 μm | Type4 |
| SB6N58 | Sn 90.0% Ag 3.5% Bi 0.5% In 6.0% |  | 20-39 μm | Type4 |
| S5A58 | Sn 95% Sb 5.0% |  | 20-39 μm | Type4 |

TABLE 6

| Product name | Components excepting oleyl alcohol (mass %) | Oleyl alcohol (mass %) |
|---|---|---|
| Oleyl alcohol VP | — | 100.0 |
| Novol | — | 100.0 |
| RIKACOL 60B | 44.4 | 55.6 |
| RIKACOL 75BJ | 34.8 | 65.2 |
| RIKACOL 110BJ | 43.3 | 56.7 |
| Trans-2-tridecen-1-ol | 100.0 | — |

<Evaluation of Printability>

300 g of the solder paste according to each of Examples and Comparative Examples was put on a metal stencil set in a printer (YSP manufactured by Yamaha Motor Co., Ltd.)

(Print Conditions)
Print environment: at a temperature of 24 to 26° C. and a humidity of 50 to 60% RH
Print squeegee: metal squeegee
Squeegee angle: 60°
Metal stencil thickness: 150 μm
Print speed: 40 nm/sec
Shape and size of pad: □ shape, 0.25 mm×0.25 mm
Number of pad: 100 (50 pads×n=2)
Material of pad: OSP-treated copper
Aspect ratio of metal stencil (area of the openings in the metal stencil (0.0625 mm$^2$)/area of the side surface of the openings in the metal stencil (0.15 mm$^2$)): 0.42

A solder on copper pads of each of the printed boards was detected by KOHYOUNG aSPIer to determine a volume % of the solder. Thereby, the transfer rate of the solder was calculated. The ratio of pads having a volume % of 100% or more (i.e., a filling ratio of 100% or more), the ratio of pads having a volume % of 70% or more and less than 100% (i.e., a filling ratio of 70% or more and less than 100%), and the ratio of pads having a volume % of less than 70% (i.e., a filling ratio of less than 70%) based on the entire pads (100 pads) in each of the printed boards are shown in Table 1, Table 2, and Table 3.

In the evaluation of the transfer rate, the cases where 90% or more of pads have a filling ratio of 70% or more and less than 100% were judged as "pass", and the other cases were judged as "fail". The results are shown in Table 1, Table 2, and Table 3.

As seen from the results in Table 1 and Table 2, the solder paste of each of Examples fulfilling all the requirements of the present invention, in which 90% or more of pads have a filling ratio of 70% or more and less than 100%, have an excellent printability when a metal stencil having minute openings and a low aspect ratio is used.

On the other hand, since less than 90% of pads have a filling ratio of 70% or more and less than 100% in the solder paste of each of Comparative Examples 1 to 3 and 5 to 8 with no oleyl alcohol and the solder paste of Comparative Example 4 having a content of oleyl alcohol exceeding 12.0 mass %, it can be found that these solder pastes are inferior in the printability at the time of using a metal stencil having minute openings and a low aspect ratio.

The invention claimed is:

1. A flux used for soldering, the flux comprising:
an unsaturated aliphatic alcohol having one unsaturated bond;
a thixotropic agent;
a solvent; and
a resin, wherein
the unsaturated aliphatic alcohol comprises oleyl alcohol,
a content of the oleyl alcohol is 2.0 mass % or more and 12.0 mass % or less based on the entire flux, and
a content of the resin is 30.0 mass% or more and 70.0 mass % or less based on the entire flux.

2. The flux according to claim 1, wherein
a content of the oleyl alcohol is 4.0 mass % or more and 8.0 mass % or less based on the entire flux.

3. The flux according to claim 2, wherein
the unsaturated aliphatic alcohol is composed of oleyl alcohol.

4. A solder paste comprising the flux according to claim 3, and solder alloy powder.

5. The solder paste according to claim 4, wherein
an alloy of the solder alloy powder is an alloy of Sn/Ag/Cu.

6. The solder paste according to claim 5, wherein
the alloy of Sn/Ag/Cu further comprises at least one selected from the group consisting of In, Bi, Sb, and Ni.

7. A solder paste comprising the flux according to claim 2, and solder alloy powder.

8. The solder paste according to claim 7, wherein
an alloy of the solder alloy powder is an alloy of Sn/Ag/Cu.

9. The solder paste according to claim 8, wherein
the alloy of Sn/Ag/Cu further comprises at least one selected from the group consisting of In, Bi, Sb, and Ni.

10. The flux according to claim 1, wherein
the unsaturated aliphatic alcohol is composed of oleyl alcohol.

11. A solder paste comprising the flux according to claim 10, and solder alloy powder.

12. The solder paste according to claim 11, wherein
an alloy of the solder alloy powder is an alloy of Sn/Ag/Cu.

13. The solder paste according to claim 12, wherein
the alloy of Sn/Ag/Cu further comprises at least one selected from the group consisting of In, Bi, Sb, and Ni.

14. A solder paste comprising the flux according to claim 1, and solder alloy powder.

15. The solder paste according to claim 14, wherein
an alloy of the solder alloy powder is an alloy of Sn/Ag/Cu.

16. The solder paste according to claim 15, wherein
the alloy of Sn/Ag/Cu further comprises at least one selected from the group consisting of In, Bi, Sb, and Ni.

* * * * *